US009436663B2

(12) United States Patent
Hailpern et al.

(10) Patent No.: US 9,436,663 B2
(45) Date of Patent: Sep. 6, 2016

(54) PRESENTING DOCUMENTS TO A USER BASED ON TOPICS AND COLLECTIVE OPINIONS EXPRESSED IN THE DOCUMENTS

(71) Applicant: HEWLETT-PACKARD DEVELOPMENT COMPANY, L. P., Houston, TX (US)

(72) Inventors: Joshua Hailpern, Mountain View, CA (US); Bernardo Huberman, Palo Alto, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 631 days.

(21) Appl. No.: 13/717,151

(22) Filed: Dec. 17, 2012

(65) Prior Publication Data

US 2014/0173425 A1    Jun. 19, 2014

(51) Int. Cl.
*G06F 17/24* (2006.01)
*G06F 17/27* (2006.01)
*G06F 17/30* (2006.01)

(52) U.S. Cl.
CPC ........... *G06F 17/24* (2013.01); *G06F 17/2745* (2013.01); *G06F 17/30705* (2013.01)

(58) Field of Classification Search
CPC ................................................ G06F 17/30705
See application file for complete search history.

(56) References Cited

U.S. PATENT DOCUMENTS

| | | | |
|---|---|---|---|
| 7,283,992 | B2 | 10/2007 | Liu et al. |
| 7,480,871 | B2 | 1/2009 | Kamikido et al. |
| D607,894 | S | 1/2010 | Prater |
| D614,638 | S | 4/2010 | Viegers |
| 7,895,225 | B1 | 2/2011 | Thirumalai et al. |
| D667,019 | S | 9/2012 | Chaudhri |
| D680,125 | S | 4/2013 | Chaudhri |
| D693,838 | S | 11/2013 | Gardner |
| 2008/0154883 | A1* | 6/2008 | Chowdhury et al. ............. 707/5 |
| 2009/0177543 | A1 | 7/2009 | Ram et al. |
| 2009/0249223 | A1 | 10/2009 | Barsook |
| 2011/0179009 | A1* | 7/2011 | Nam .................. G06Q 30/0256 707/708 |
| 2011/0202484 | A1 | 8/2011 | Anerousis et al. |
| 2012/0254184 | A1 | 10/2012 | Choudhary et al. |
| 2012/0278741 | A1 | 11/2012 | Garrity |
| 2013/0054502 | A1* | 2/2013 | Fano et al. ...................... 706/46 |

OTHER PUBLICATIONS

Pak, A. et al., Twitter as a Corpus for Sentiment Analysis and Opinion Mining, (Research Paper), May 19-21, 2010, 7 Pages.
Sarmento, L. et al., Automatic Creation of a Reference Corpus for Political Opinion Mining in User-generated Content, (Research Paper), Nov. 6, 2009, 7 Pages.

* cited by examiner

*Primary Examiner* — Asher Kells
(74) *Attorney, Agent, or Firm* — Hewlett Packard Enterprise Patent Department

(57) ABSTRACT

A content platform for presenting documents to a user based on topics and collective opinions expressed in the documents is disclosed. The content platform mines a corpus of documents to identify a set of topics and analyzes each document in the corpus of documents to determine a set of opinions associated with the set of topics. The corpus of documents is presented to the user based on the set of topics and the set of opinions. Each document in the corpus of documents is visually modified to focus the user's attention on the set of opinions associated with the set of topics.

15 Claims, 16 Drawing Sheets

PRESENTING DOCUMENTS TO A USER BASED ON TOPICS AND COLLECTIVE OPINIONS EXPRESSED IN THE DOCUMENTS

BACKGROUND

The explosive growth of user generated content, along with the increasing number and types of content sources, has made it challenging for users to sort out relevant pieces of information from the massive amounts of content available. In this information age where content is king, few content items live in a vacuum. Documents that express opinions or subject evaluations on a range of topics abound. Knowledge workers (e.g., political analysts, financial investors, economists, and business executives), legal professionals (e.g., clerks, lawyers, and judges), and those reading about other topics (e.g., entertainment, health, sports) have to navigate hundreds if not thousands of documents that have opinions, from which it is often hard to extract the relevant information needed.

This content proliferation, while empowering, has led to a poverty of attention. Users' attention to online content is often distributed in a highly skewed fashion. Most documents receive a negligible amount of attention, while only a few become extremely popular. Users may find it difficult to browse/find the most salient documents in a large corpus of documents and quickly spot relevant opinions in each document to situate them within a "big picture". Potentially relevant content may therefore be missed when users forage for information among large corpuses of interlinked documents.

Currently available content and document browsing solutions fail to help users allocate their attention effectively among the overabundance of information sources that might consume it. The currently available solutions suffer from critical limitations, including not being able to situate each document's opinion in a broader context and present key opinions in a manner that is natural to users. Many of the existing solutions add to the information overload by presenting the users with more information (e.g., multiple documents side-by-side) in increasingly smaller areas of screen real-estate. Reading documents in parallel may lead to issues of practice inference in working memory, thereby making it even more difficult for users to extract and remember relevant content.

BRIEF DESCRIPTION OF THE DRAWINGS

The present application may be more fully appreciated in connection with the following detailed description taken in conjunction with the accompanying drawings, in which like reference characters refer to like parts throughout, and in which.

DETAILED DESCRIPTION

A content platform for presenting documents to a user based on topics and collective opinions expressed in the documents is disclosed. The content platform enables users to quickly find relevant documents in a lame corpus of documents and relevant opinions on topics within the documents, as though the documents were constructed and laid out by an editor while powered by the wisdom of the crowd. The documents may include text, graphics, sound, video, and any other information that can be accessed in an electronic device, be it a computer, laptop, tablet, phone, gaming device, or other such device. The corpus of documents may include a collection of documents of a specific kind or on a specific subject, such as, for example, legal documents in a given lawsuit, articles written by a given author, documents discussing an issue, and so on. As generally described herein, a topic may include a subject of discussion or conversation and an opinion may include a view, belief, or judgment about a topic. The wisdom of the crowd refers to the collective opinions expressed in a corpus of documents about one or more topics.

In various examples, the content platform may include a document mining engine to mine a corpus of documents to determine a set of opinions associated with a set of topics, a document locator user interface engine to present the corpus of documents to a user based on the set of topics and the set of opinions, and a document reader user interface engine to enable the user to read an edited document in the corpus of documents, such that the edited document is visually modified according to the set of topics and the set of opinions. As described in more detail herein below, the document mining engine employs machine learning techniques to traverse a corpus of documents so that it can gather the collective intelligence of the crowd to find and distill crucial opinions on key topics. The document locator user interface engine enables a user to browse the large corpus of documents based on the key topics and associated opinions, and open each document with the document reader user interface engine. The document reader user interface engine enables the user to read an edited, visually modified document in a natural way that drives the user's attention to opinions that are representative of the crowd (i.e., representative of what all the documents are saying about a topic) and also opinions in each document that go against the grain, i.e., opinions that are out-of-line with the crowd.

It is appreciated that, in the following description, numerous specific details are set forth to provide a thorough understanding of the examples. However, it is appreciated that the examples may be practiced without limitation to these specific details. In other instances, well known methods and structures may not be described in detail to avoid unnecessarily obscuring the description of the examples. Also, the examples may be used in combination with each other.

Figure 1:
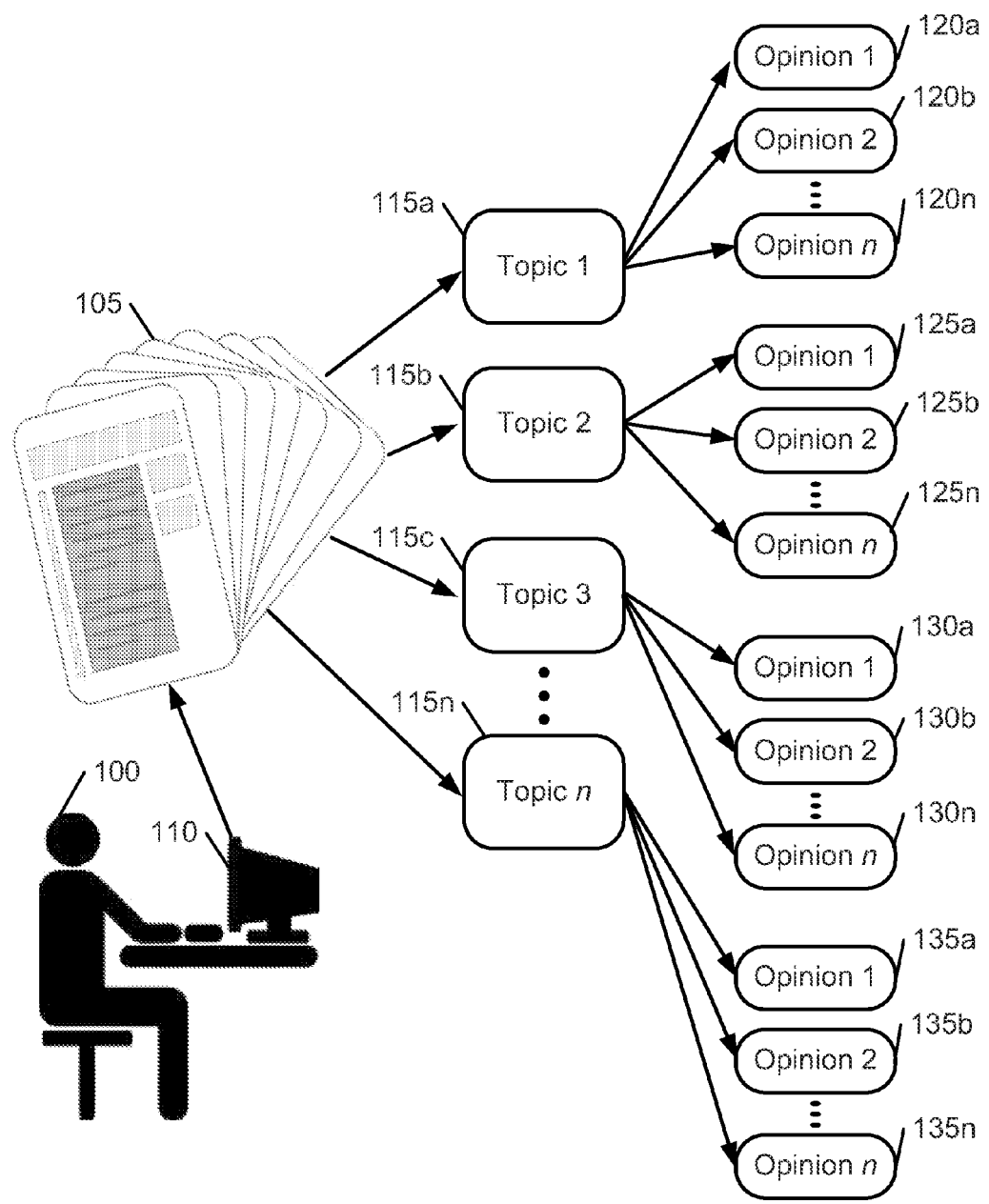
FIG. 1 illustrates a schematic diagram of an environment where a content platform is used in accordance with various examples.

Referring now to FIG. 1, a schematic diagram of an environment where the content platform is used in accordance with various examples is described. User 100 has electronic access to a corpus of documents 105 containing a large (e.g., 100s, 1000s, 1000000s, etc.) number of documents. The electronic access may be via an electronic device such as a computer 110, or a laptop, tablet, phone, gaming device, or any other such device. User 100 may be a knowledge worker or professional (e.g., political analyst, finance professional, business executive, writer, legal professional, educator, health professional, etc.) reviewing the corpus of documents 105 to extract, understand, and analyze its contents in a limited amount of time. Each document in the corpus of documents 105 may contain text (and other information such as images, graphics, video, etc.) that describes a number of topics 115$a$-$n$, with each topic characterized by a number of opinions (i.e., topic 115$a$ characterized by opinions 120$a$-$n$, topic 115$b$ characterized by opinions 125$a$-$n$, topic 115$c$ characterized by opinions 130$a$-$n$, and topic 115$n$ characterized by opinions 135$a$-$n$).

For example, the user 100 may be apolitical analyst for a television network working on a story about a presidential election and interested in learning more about the selection of a given vice-presidential candidate. The user 100 has access to a corpus of documents 105 containing articles on the election from a number of sources, e.g., news agencies, newspapers, magazines, blogs, user-generated content from various sites, database collections, web sites, or various other sources. Each document in the corpus of documents 105 has text describing election topics and opinions on the topics. A topic may include, for example, the subjects "Ryan" (for vice-presidential candidate Paul Ryan), "Romney" (for presidential candidate Mitt Romney), "taxes", "campaign", and "budget", among others. An opinion about a topic may include views such as "taxes are high", "campaign is tight", and "budget is important".

The content platform described, below enables the user 100 to quickly find documents in the corpus of documents 105 based on key topics and opinions in the documents. The user 100 can, among other examples, see all documents in the corpus of documents 105 sorted alphabetically with a list of all topics found in the documents, see only the documents that pertain to a given topic, filter the documents by how representative or out-of-line they are on a given topic, and read an edited, visually-modified document with called-out text according to how important the topic is and how closely aligned (or out-of-line) opinions on the topic are to those of the crowd.

Figure 2:
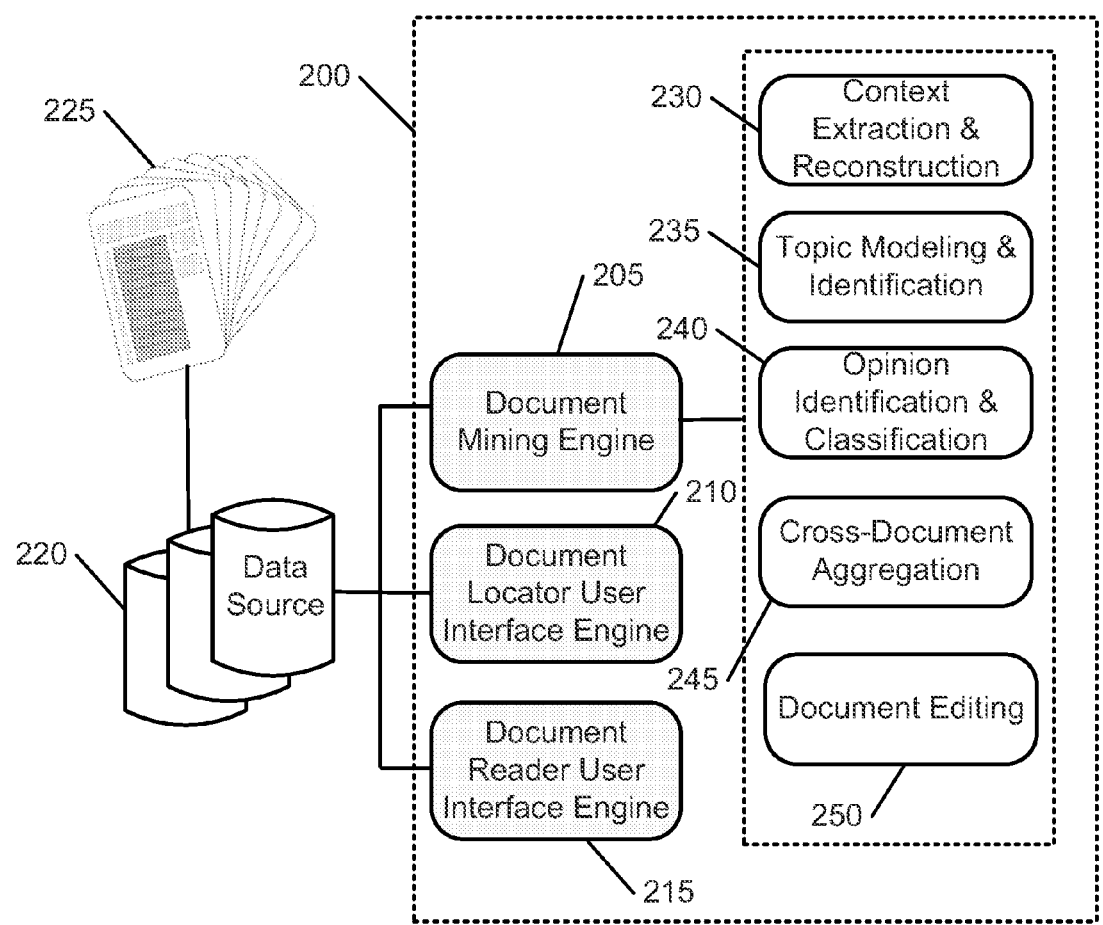
FIG. 2 illustrates examples of physical and logical components for implementing a content platform.

Attention is now directed to FIG. 2, which shows examples of physical and logical components for implementing the content platform. Content platform system 200 has various engines representing a combination of hardware and software, including: Document Mining engine 205, Document Locator User Interface engine 210, and Document Reader User Interface engine 215. Engines 205-215 operate in communication with one or more data stores 220 storing a corpus of documents 225.

The Document Mining engine 205 mines the corpus of documents 225 to determine a set of opinions associated with a set of topics. The Document Mining engine 205 employs machine learning techniques and is implemented in multiple stages explained in more detail below and including, for example: (1) Content Extraction and Reconstruction stage 230; (2) Topic Modeling and Identification stage 235; (3) Opinion Identification and Classification stage 240; (4) Cross-Document Aggregation stage 245; and (5) Document Editing stage 250.

The Content Extraction stage 230 extracts a body copy of each document and reconstructs each document to make it easier to identify and visually modify each element in the document if needed. A body copy, as generally described herein, consists of the main text of a document, as compared to logos, images, title, advertisements, comments, etc. The Topic Modeling & identification stage 235 identifies what the documents in the corpus of documents 225 are talking about, that is, the topics discussed in the documents. The Opinion Identification & Classification stage 240 identifies the opinions on each topic of discussion. The Cross-Document Aggregation stage 245 aggregates all opinions on each topic across all documents in the corpus of documents 225. The Document Editing stage 250 determines which topics and opinions should be called out to a user (e.g., user 100) and how much to visually bring them to the user's attention.

Once the corpus of documents 225 are mined by the Document Mining engine 205, they are ready for the user to review using the Document Locator User Interface engine 210 and the Document Reader User Interface engine 215). The Document Locator User Interface engine 210 implements a Document Locator User Interface that a user sees when reviewing a corpus of documents such as corpus 225. The Document Locator User Interface engine 210 enables the user to see all documents in the corpus of documents 225 sorted alphabetically with a list of all topics found in the documents, see only the documents that pertain to a given topic, and filter the documents by how representative or out-of-line they are on a given topic. The user can select a document to read with the Document Locator User Interface (i.e., by clicking on a link to the document) and an edited, visually modified document is displayed with a Document Reader User interface implemented by the Document Reader User Interface engine 215. The Document Reader User Interface engine 215 enables the user to read an edited, visually modified document with called-out text according to how important the topic is and how closely aligned (or out-of-line) opinions on the topic are to those of the crowd.

Figure 3:
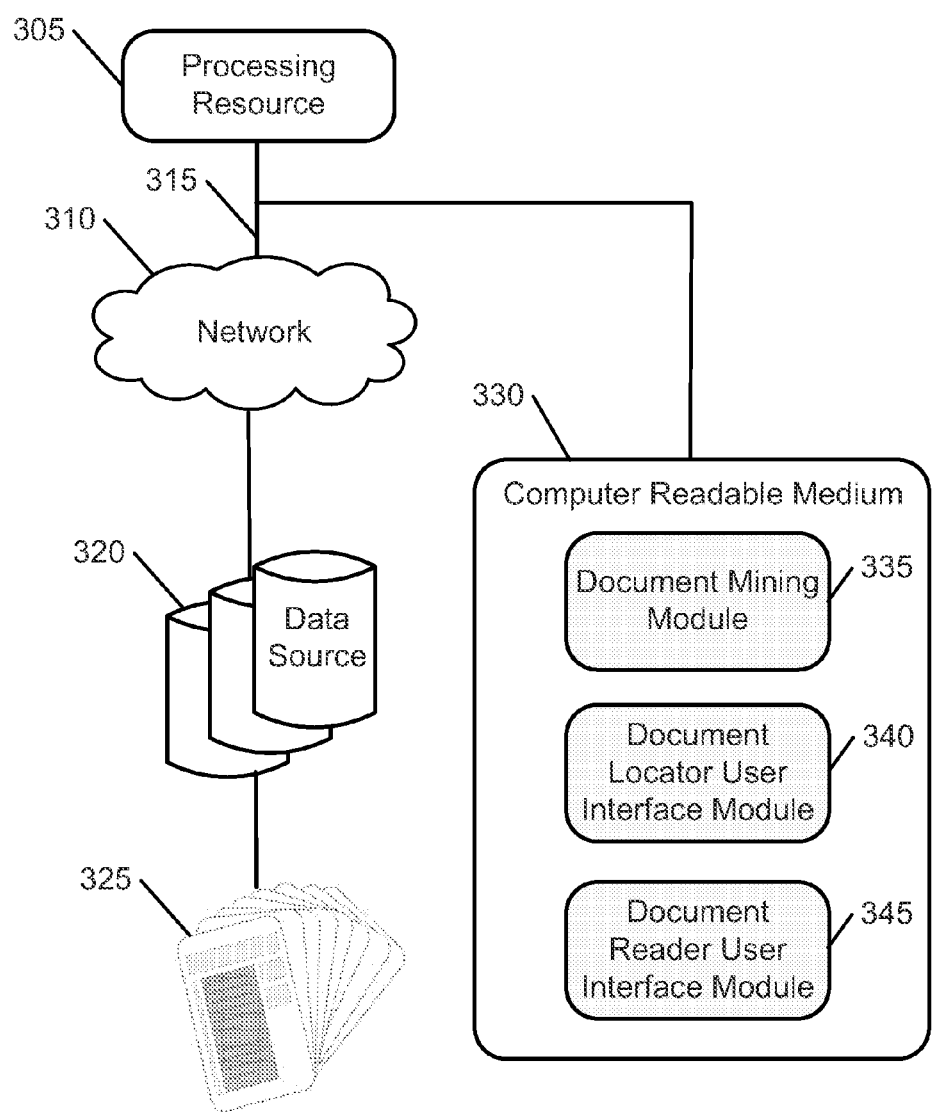
FIG. 3 illustrates an example implementation o' le content platform of FIG. 2.

It is appreciated that Document Mining engine 205, Document Locator User Interface engine 210, and Document Reader User Interface engine 215 can be implemented in a number of fashions. FIG. 3 shows an example implementation with instructions executable by a processing resource 305 and stored on a tangible, non-transitory computer readable medium 310. Processing resource 305 can include one or multiple processors. Such multiple processors may be integrated in a single device or distributed across devices (e.g., in one or more web servers). The processing resource 305 can be connected to a network 310 by a wired or a wireless link 315. Data sources 320 storing a corpus of documents 325 may be accessible by the processing resource 305 via the network 310.

Computer readable medium 330 stores instructions that when executed by processing resource 305 implements the content platform system 200 illustrated, in FIG. 2. As appreciated by one skilled in the art, computer readable medium 330 may be integrated in the same device as the processing resource 305 or it may be separate but accessible to that device and processing resource 305.

In one example, the instructions can be part of an installation package that when installed can be executed by processing resource 305 to implement content platform system 300. In this case, computer readable medium 330 may be a portable medium such as a CD, DVD, flash drive or memory maintained by a server from which the installation package can be downloaded and installed. In another example, the instructions may be part of an application or applications already installed. Here, computer readable medium 330 can include integrated memory such as a hard drive, solid state drive, or the like.

In FIG. 3, the executable instructions stored in computer readable medium 330 are represented as Document Mining module 335, Document Locator User Interface module 340, and Document Reader User Interface module 345, that when executed by processing resource 305 implement the content platform system 200 of FIG. 2. Document Mining module 335 represents instructions that when executed function as Document Mining engine 205. Document Locator User Interface module 340 represents instructions that when executed function as Document Locator User Interface engine 210. Document Reader User Interface module 345 represents instructions that when executed function as Document Reader User Interface engine 215.

Figure 4:
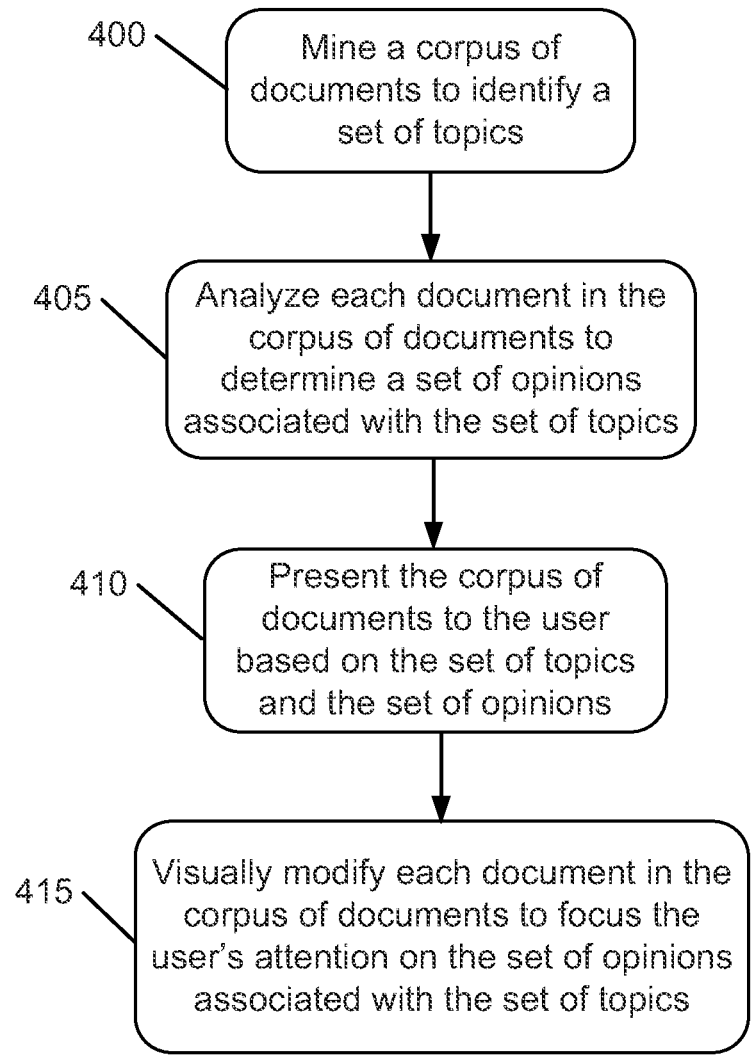
FIG. 4 is a flowchart of example operations performed by the content platform of FIG. 2 for presenting documents to a user based on topics and collective opinions expressed in the documents.

Referring now to FIG. 4, a flowchart of example operations of the content platform of FIG. 2 for presenting documents to a user based on topics and collective opinions expressed in the documents is described. First, a corpus of documents is mined to identify a set of topics (400). The corpus of documents may be stored in one or more data sources (e.g., corpus of documents 225 stored in data sources 220 or corpus of documents 325 stored in data sources 320) and mined by, for example, Document Mining engine 205 (FIG. 2). Each document in the corpus of documents is then analyzed (e.g., by the Document Mining engine 205) to determine a set of opinions associated with the set of topics (405). The corpus of documents is then presented to the user based on the set of topics and the set of opinions (410). The documents may be presented by, for example, the Document Locator User Interface engine 210 (FIG. 2). Lastly, each document in the corpus of documents is edited or visually modified to focus the user's attention on the set of opinions associated with the set of topics (415). Each document is edited or visually modified by, for example, the Document Mining engine 205 (FIG. 2) and presented to the user with the Document Reader User Interface engine 215 (FIG. 2).

As described above in FIG. 2, the Document Mining Engine 205 may implement steps 400, 410 and 415 in multiple stages. For example, step 400 may be implemented by the Content Extraction and Reconstruction stage 230 and the Topic Modeling and Identification Stage 235. Step 410 may be implemented by the Opinion Identification and Classification stage 240 and the Cross-Document Aggregation stage 245. And step 415 may be implemented by the Document Editing stage 250. These stages are now described in more detail.

Figure 5:
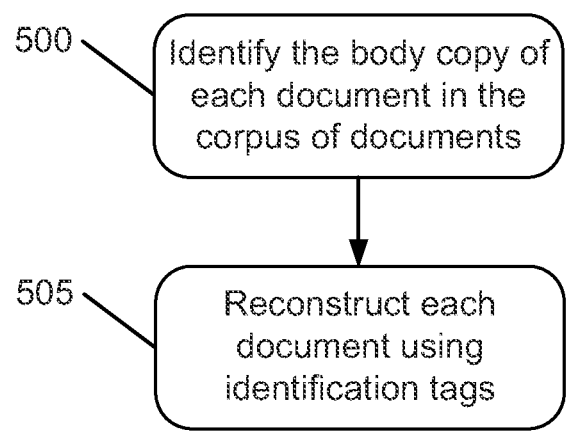
FIG. 5 is a flowchart for implementing the Content Extraction and Reconstruction stage of FIG. 2.

FIG. 5 is a flowchart for implementing the Content Extraction and Reconstruction stage of FIG. 2. First, the corpus of documents (e.g., corpus of documents 225 stored in data sources 220 or corpus of documents 325 stored in data sources 320) is crawled and each document in the corpus of documents is cleaned to identify its body copy (500). The body copy extraction depends on the type and format of the document. For example, extracting the body copy of a PDF document is simpler than extracting the body copy of HTML or other web content since PDF documents typically do not contain copious amounts of non-body copy material. Unlike PDFs, raw HTML documents may have navigation elements, ads, comments, or other non body copy content. Further complicating body copy extraction is that every HTML document may use different Cascading Style Sheet ("CCS") markup for its content. While templates, hand-coded or auto-generated, are often used to identify body copy, the number of templates needed would grow quite large (e.g., consider the diversity of the set of all sources front online news sources). One example to identify the body copy of HTML documents is to use the Content Extraction via Tag Ratios ("CETR") technique, which extracts body copy from HTML documents using HTML tag ratios and multidimensional clustering.

Once the body copy of a given document is extracted, the document is reconstructed using identification tags (505). For example, the identification tags may be HTML <span> or <p> tags. Each paragraph, sentence and word in a document may be labeled with a distinct identification tag. Doing so enables any element of text to be easily found using JavaScript or other such lookups and edited or visually modified as desired.

Figure 6:
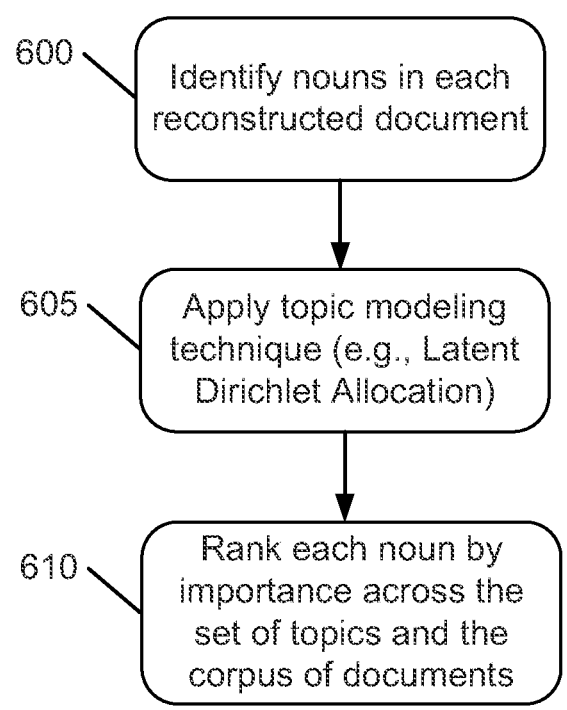
FIG. 6 is a flowchart for implementing the Topic Modeling and Identification stage of FIG. 2.

Once the documents in the corpus of documents have been reconstructed based on their body copy, the next step is to identify what the documents within the corpus of documents are talking about. FIG. 6 is a flowchart for implementing the Topic Modeling and Identification stage of FIG. 2. First, the nouns in each reconstructed document are identified (600). The nouns are used to determine the topics discussed in the corpus of documents as they are generally considered to be the "subject" of a sentence. In one example, Part-of-Speech ("POS") tagging may be used to identify the nouns and filter the reconstructed documents.

With the nouns identified, the next step is to apply a topic modeling technique (605), such as, for example, for example, the Latent Dirichlet Allocation ("LDA") model. The LDA model considers each document as being the outcome of a mix of topics which each generate some portion of the document's content. Consider T to be the set of all topics ($t_0, t_1, \ldots, t_k$), D to be the set of all documents in the corpus of documents ($d_0, d_1, \ldots, d_l$), and W to be the set of all unique words ($w_0, w_1, \ldots w_m$) across all documents. Every document (di) consists of a subset of words from W. Every topic ($t_j$) consists of a subset of words from W, each with a probability $P(w_q|t_j)$ that if a word is randomly chosen from it is that particular word ($w_q$). In this way, $t_j$ is a probability distribution over W as follows:

$$\sum_{q=0}^{m} P(w_q | t_j) = 1 \qquad (Eq. 1)$$

And a document $d_i$ consists of a probability distribution over all topics T:

$$\sum_{j=0}^{k} P(t_j | d_i) = 1 \qquad (Eq. 2)$$

That is, every word in a document is contributed by one of the topics,

The goal of a topic modeling approach is ultimately to rank all words in W based on how important they are across all topics and documents (610). Here, the words are the nouns that have been identified in each reconstructed document. The LDA model determines the rank $P(w_q|t_j)$ each word ($w_q$) given a particular topic ($t_j$). However, these word probabilities cannot be compared across topics as they are conditional. The rank for each word $P(w_q)$ is therefore determined across all topics:

$$P(w_q) = \sum_{j=0}^{k} P(w_q|t_j) P(t_j) \qquad \text{(Eq. 3)}$$

This calculates for each word, a rank that is topic independent, and therefore valid across the corpus of documents. The rank from Equation 3 therefore determines an order of importance of all topics of discussion in the corpus of documents.

Figure 7:
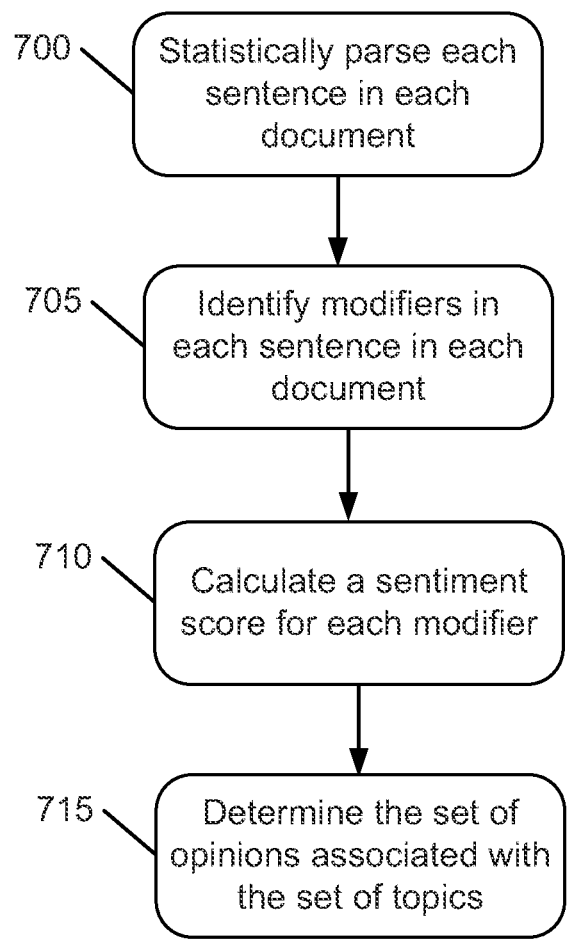
FIG. 7 is a flowchart for implementing the Opinion identification & Classification stage of FIG. 2.

Once the most important topics in the corpus of documents have been identified, the next step is to identify a set of opinions associated with the set of topics. Attention is now directed to FIG. 7, which illustrates a flowchart for implementing the Opinion Identification & Classification stage of FIG. 2. The first step is to statistically parse each sentence in each document, generating a full parse tree, a dependence parse tree, and the POS for each word (700). From these parse trees, the modifiers (e.g., adjectives) in each sentence of each document are identified (705).

Next, a sentiment score is calculated for each modifier identified (710). In one example, the sentiment score may be calculated by looking up the value of the modifier in a resource such as Senti-WordNet, which is a hand-compiled list covering a large selection of common word modifiers. Each word is evaluated on two 0.0-1.0 scales, positive and negative. For example, the word "ugly" may have a negative score, while the word "beautiful" may have a positive one. Other words such as "red" may have more of a neutral score. Both positive and negative values are maintained for each modifier, because if combined on a single scale, on average, most results would trend towards neutral. It is appreciated that modifier lookup does not provide a sentiment score that takes into account word sense disambiguation (i.e., context). However, it enables an explicit association between a modifier and a subject in a sentence.

Lastly, a set of opinions is determined by associating the modifiers identified with their corresponding subjects/topics (715). That is, for each of the most important topics ($w_q$) identified as described with reference to FIG. 6, a set of opinions $O(w_q)$ within each sentence where the topic occurs can be expressed as:

$$O(w_q) = [o_1(w_q), o_2(w_q), \ldots, o_n(w_q)] \qquad \text{(Eq. 4)}$$

Where $o_i(w_q)$ represents a modifier associated with a topic $w_q$. For example, $w_q$ may be "taxes" and $o_i(w_q)$ may be "high". One may notice that this gives a set of opinions for each subject in each document. As subjects may appear multiple times throughout the corpus of documents, the next step is then to aggregate all opinions on each subject over all documents in the corpus of documents.

Figure 8:
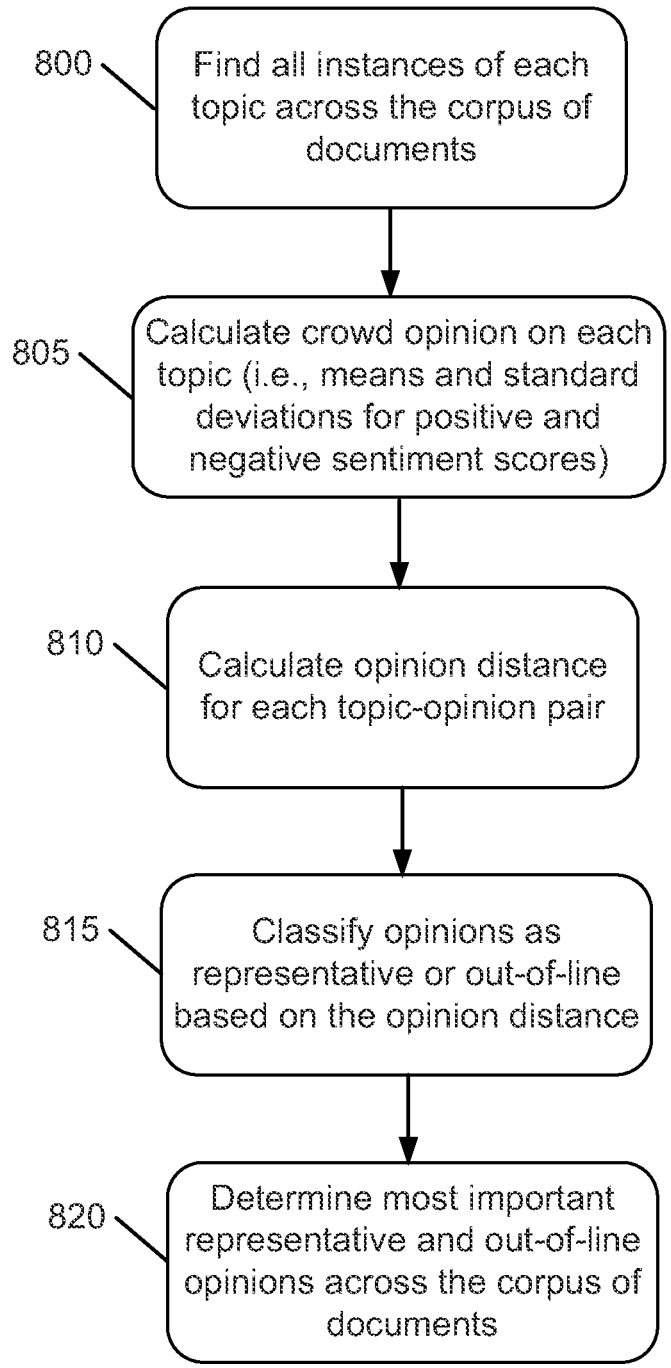
FIG. 8 is a flowchart for implementing the Cross-Document Aggregation stage of FIG. 2.

Referring now to FIG. 8, a flowchart for implementing the Cross-Document Aggregation stage of FIG. 2 is described. First, all instances of each topic across the corpus of documents are found by comparing the base form of each word and Americanizing all spelling (800). For a given corpus of documents, the stages described herein thus far (FIGS. 5-7) resulted in a weighted list of topics (i.e., the ranked topics from FIG. 6) and for each topic, a distribution of opinions $O(w_q)$ (from FIG. 7), that is, a list of topic-opinion pairs.

The next step is to aggregate these topics-opinions pairs across all documents in the corpus of documents to determine the collective, crowd opinions on each topic. Here, this is determined by calculating a mean positive sentiment score $\mu_{pos}(w_q)$ and a mean negative sentiment score $\mu_{neg}(w_q)$, as well as the standard deviations $\sigma_{pos}(w_q)$ and $\sigma_{neg}(w_q)$ (805). Then, for each topic-opinion pair in each document, i.e., for each $o_v(w_q)$, an opinion distance measure $F(o_v(w_q))$ can be calculated as (810):

$$F(o_v(w_q)) = \langle F_{pos}(o_v(w_q)), F_{neg}(o_v(w_q)) \rangle \qquad \text{(Eq. 5)}$$

where $F_{pos}(o_v(w_q))$ gives a distance for a positive opinion relative to the crowd's positive opinions about a topic and $F_{neg}(o_v(w_q))$ gives a distance for a negative opinion relative to the crowd's negative opinion about a topic. These can be determined as:

$$F_{pos}(o_v(w_q)) = \frac{|o_{pos,v}(w_q) - \mu_{pos}(w_q)|}{\sigma_{pos}(w_q)} \qquad \text{(Eq. 6)}$$

$$F_{neg}(o_v(w_q)) = \frac{|o_{neg,v}(w_q) - \mu_{neg}(w_q)|}{\sigma_{neg}(w_q)} \qquad \text{(Eq. 7)}$$

The opinion distance computed in Equation 5 can be used to determine which opinions are "representative" or "out-of-line" with the crowd (815). A topic-opinion pair "taxes are high") is deemed to be representative of the crowd when its opinion distance $F(o_v(w_q))$ is less than or equal to one (i.e., within one standard deviation). If the opinion distance is greater than one, the topic-opinion pair is deemed to be out-of-line from the crowd.

Figure 9:
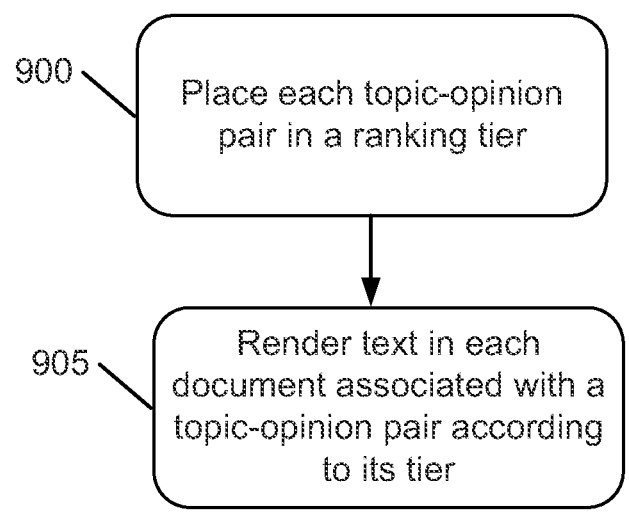
FIG. 9 is a flowchart for implementing the Document Editing stage of FIG. 2.

Finally, for each document, the most important representative and out-of-line opinions are determined (820) so that they can be visually modified accordingly in the Document Editing stage 250 described below with reference to FIG. 9. The most important representative and out-of-line topic-opinion pairs can be determined by computing a rank for each topic-opinion pair as follows:

$$F_L(o_v(w_q)) = \text{MAX}(F_{pos}(o_v(w_q)), F_{neg}(o_v(w_q))) \qquad \text{(Eq. 8)}$$

$$R_{out}(o_v(w_q)) \propto P(w_q) * F_L(o_v(w_q)) \qquad \text{(Eq. 9)}$$

$$R_{rep}(o_v(w_q)) \propto \frac{P(w_q)}{F_L(o_v(w_q))} \qquad \text{(Eq. 10)}$$

where $F_L(o_v(w_q))$ is the most characteristic opinion distance of a given (i.e., whether the opinion is more of a positive or negative opinion), and $R_{rep}(o_v(w_q))$ and $R_{out}(o_v(w_q))$ are rankings for the representative and out-of-line opinions, respectively.

With the rankings computed, the next step is to determine how to visually modify each document in the corpus of documents for the user to view with the Document Locator User Interface implemented by the Document Locator User Interface engine 210 and the Document Reader User Interface implemented by the Document Reader User Interface engine 215. FIG. 9 illustrates a flowchart for implementing the Document Editing stage 250 of FIG. 2. First, each topic-opinion pair is placed in a ranked tier, with separate tiers for representative and out-of-line opinions (900). This is accomplished by normalizing the ranking values from Equations 9-10 above for each topic-opinion pair in a given document, sorting the normalized ranking values in descending order, and distributing the topic-opinion pairs in the document into tiers. In one example, each tier is formed to have as many words as the tier index, i.e., at least one word in tier one, two words in tier two, etc.

Next, each document in the corpus of documents is edited or visually modified so that text in the document associated with a topic-opinion pair is rendered according to its tier (905). For example, text associated with topic-opinion pairs in tier 1 may be called out by having an entire sentence containing the topic-opinion pair replicated in a call-out box (e.g., a black box with white text). This call-out approach parallels the large call-outs commonly found in magazine articles. Any element of text in the body copy that needs to be visually distorted or undistorted can be easily found using the identification tags created in the Content Extraction and Reconstruction stage 230 (FIG. 2). Text associated with topic-opinion pairs in other tiers (e.g., tiers 2-10) can be visually modified with visual and typographic changes that call the users' attention to the topic-opinion pairs at various degrees with bold, italic, highlighted, or other emphasized text). The lower the tier, the more the information should be brought to the user's attention via visual changes (e.g., tier 1 text should be easier to locate than tier 10).

The following description illustrates examples of how these visual modifications are seen by a user with the Document Locator User Interface implemented by the Document Locator User Interface engine 210 and the Document Reader User Interface implemented by the Document Reader User Interface engine 215.

Figure 10:
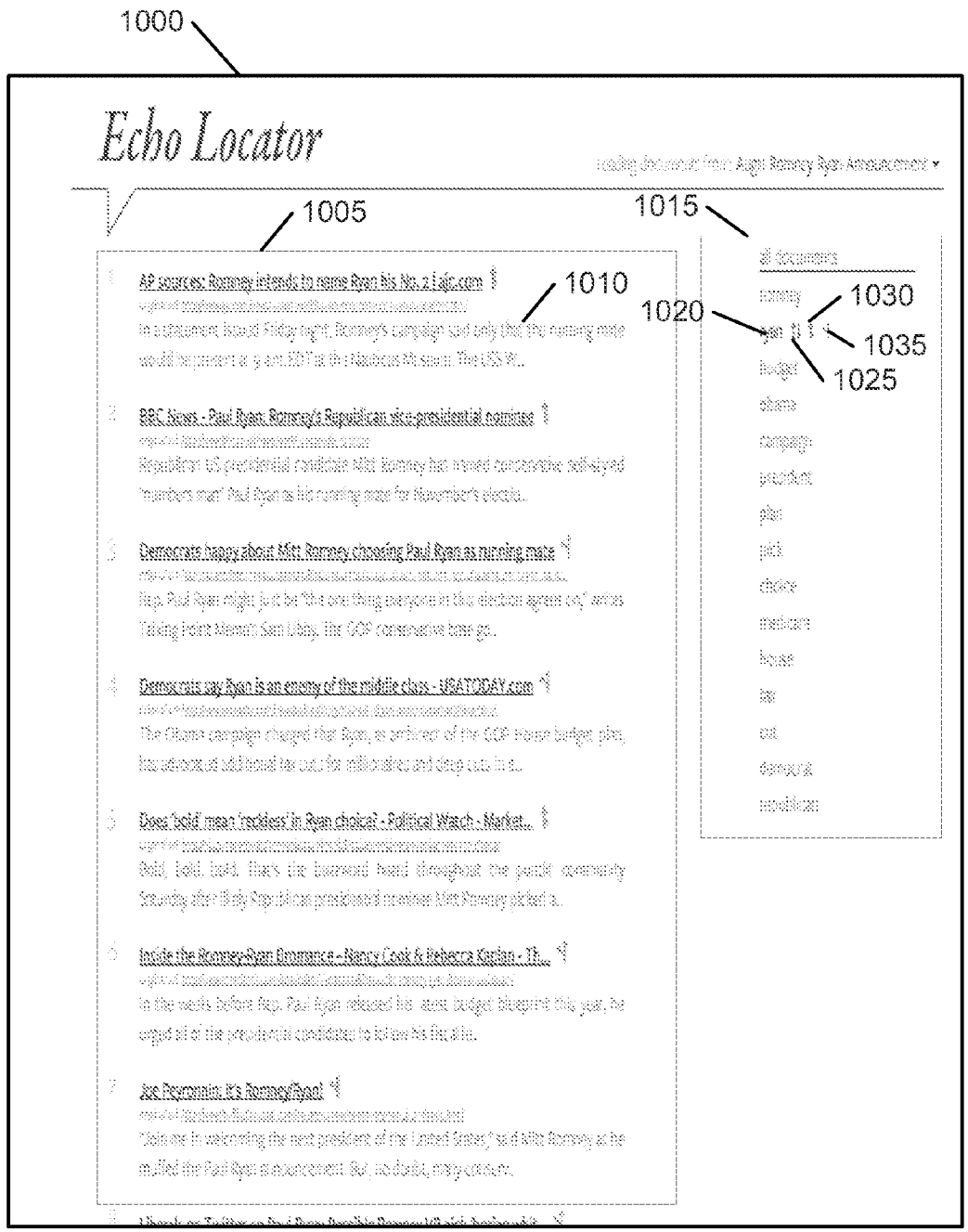
FIG. 10 is an example screenshot for a Document Locator User Interface implemented by the Document Locator User Interface engine of FIG. 2.

Referring now to FIG. 10, an example screenshot for a Document Locator User Interface is described. Screenshot 1000 is an example window that a user may see displayed when the user accesses the content platform 200 of FIG. 2. This screenshot is displayed by the Document Locator User Interface engine 210 by a user desiring to review a given corpus of documents. The corpus of documents is assumed to have been collected for the user. In one example, the user accesses the Document Locator User interface implemented by the Document Locator User Interface engine 210 in a web browser and enters a keyword in the browser to load a desired corpus of documents (e.g., the keyword "election" for a corpus of documents relating to a latest presidential election).

The user may begin by loading the corpus of documents into the content platform 200 with the Document Locator User Interface, denoted as "Echo Locator" in this example. The corpus of documents may be quite large and the user may not have the time to read each document in detail. As described above, the content platform 200 enables the user to see the most important topics and opinions (either representative or out-of-line) that reflect the wisdom of the crowd. The user can use the Echo Locator interface to see those documents that have the most representative opinions so he/she can get a high level view of the overall corpus of documents. This way the entire corpus of documents may be browsed quickly and easily by mitigating information overload.

Upon load, the user can see all documents in the corpus sorted alphabetically (1005). For each document, its title, original URL (e.g., source of the content), and a preview (1010) of the body copy is shown. Along the right side of the screenshot 1000 are the words "all documents," followed by a list of all the topics of discussion (1015) sorted by how important each topic is within the corpus of documents. This list is scrollable upon mouse hover. Should the user wish to filter the corpus of documents, the user can click on any topic (or "all documents") to show only those documents that have opinions on the clicked topic. The currently selected filter 1020 (or "Ryan") is shown in a darker color.

Whichever topic that is selected, three sort controls 1025-1035 appear to its right. By clicking on any of these icons, the current list of documents may be filtered alphabetically (default) with icon 1025, by how representative of the crowd the documents are on the given topic with icon 1030, or by how out-of-line from the crowd they are from the current topic with icon 1035. The opinion based sorts may be in descending order, so that the most representative/out-of-line document is at the top of the list.

The user can open any document desired in the list of documents 1005. For example, the user may be interested in the documents on the topic "Ryan" 1020 that contain the most representative opinions on the vice-presidential candidate Paul Ryan. The user can sort the list by clicking on the icon 1025, and open the top document shown therein. Doing so will open the desired document with the Document Reader User Interface implemented by the Document Reader User Interface engine 215 (FIG. 2).

Attention is now directed to FIGS. 11-16, which illustrate example screenshots for the Document Reader User Interface, denoted as "Echo Reader" in this example. Upon loading a desired document in Echo Reader as shown in screenshot 1100 in FIG. 11, the document 1105 appears like any standard web-based document that has been laid out well by an Editor. Some of the document's most representative opinions (as compared to the opinions of the crowd), are called out for the user's attention. As described above, the degree of visual call-out is proportional to how important the topic is, and how closely aligned those opinions are (i.e., representative) to those of the crowd. Thus, from the moment a document loads in Echo Reader, the user does not need to interact with the document and can instead scan and read the text as one normally would: crucial opinions are called to the users' attention, but not in a manner that is distracting.

The user may quickly scroll through the document to find what opinions the document has, that are shared with "the crowd." Immediately upon load, the user can find the most representative opinion in the document, which is brought to the user's attention in a black callout-box 1110. Less noteworthy opinions are brought to the user's attention in a smaller degree, being in small caps (1115), bold (1120), italic (1125), or even darker shades of gray (1130). These modifications can be combined together (e.g., with small caps and bold text 1135) to increase the degree of attention. The less the body copy is called out, the less noteworthy/representative the opinion is. This allows the user to quickly check the pulse of the community, while having the context of the document being read.

As the user scans the document 1105 and an opinion "jumps out" at him/her, he/she can easily read the surrounding sentences and place that opinion in the mental picture he/she is building. Thus by borrowing well known style metaphors from magazine layouts, the Echo Reader interface directly facilitates the user's planning phase, and incidental memory.

After scanning the document 1105, the user may be intrigued by the comment in the black call-out box 1110. To find out exactly why this is such a representative opinion, and how it fits in with that of the crowd, the user moves his/her cursor on top of the phrase in the text and sees screenshot 1200 of FIG. 12. Upon mouse hovering, a sparkline 1205 and English sentence explanation 1210 situating this opinion in a broader context appears on the right side of the page. The sparkline 1205 allows the user to see the distribution of opinions on a given topic across all documents in the corpus, e.g., for topic "Ryan" and opinion "risky" The negative part of the distribution may appear in one color (e.g., red), the positive in another color (e.g., blue), and the neutral in yet another color (e.g., gray). The portion of the distribution which contains the particular opinion 1215 that the user is interested in (which is just slightly more positive than neutral) may be filled in a darker color (1220). This allows the user to easily place opinions within a given document in the broader context of the corpus/crowd.

Figure 13:
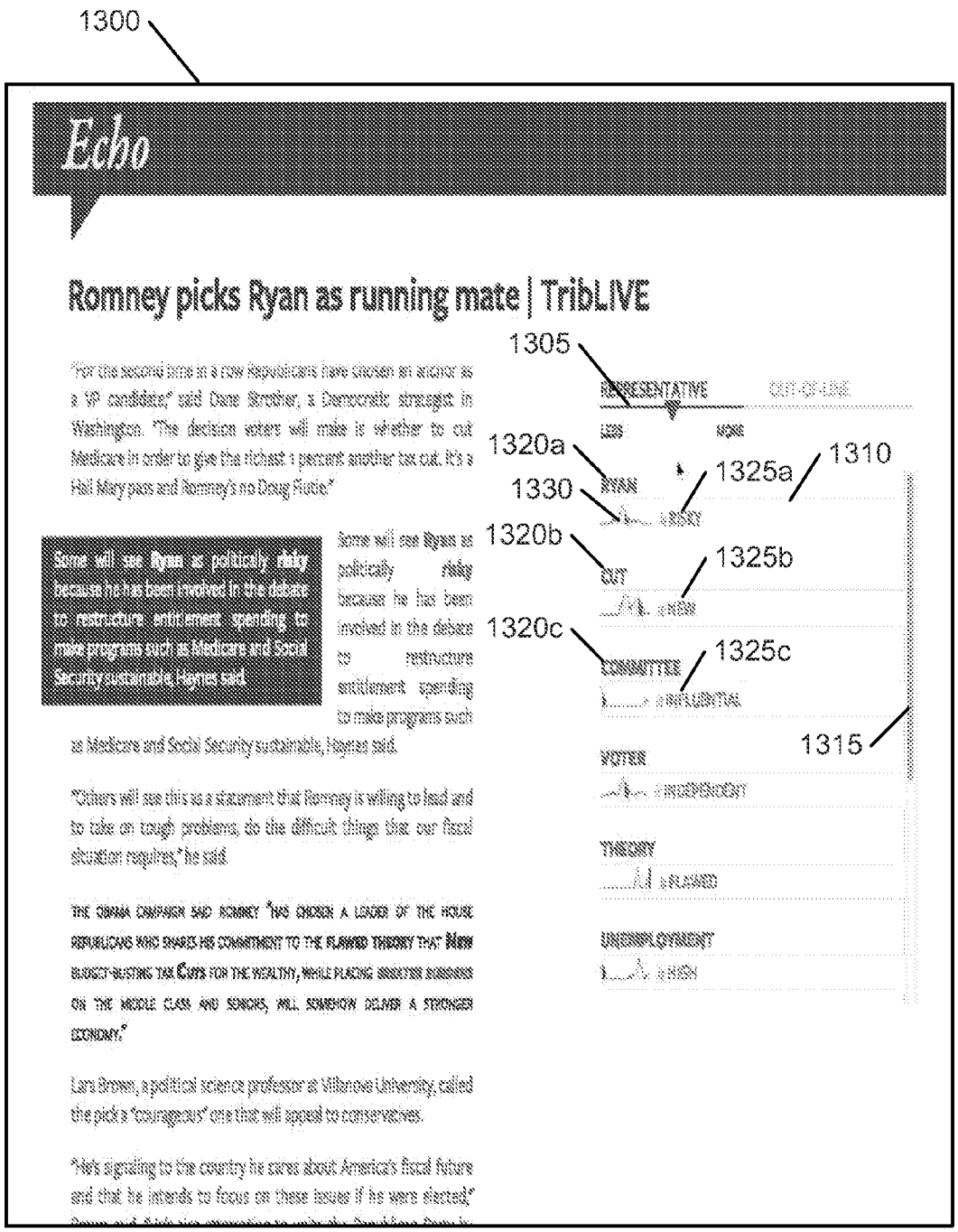
Figure 14:
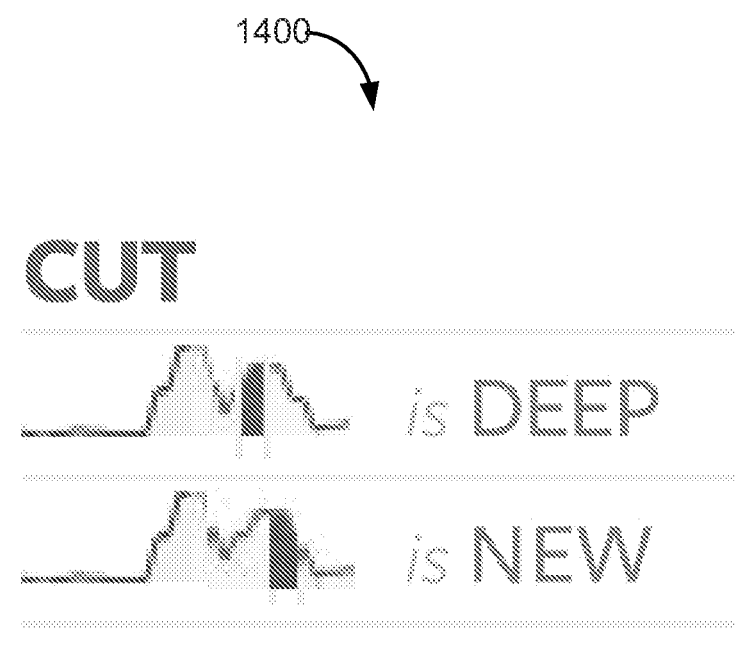
FIG. 14 illustrates an example sparkline used in the Document Reader User Interface implemented by the Document Reader User Interface engine of FIG. 2.

Attention is now directed to FIG. 13, which illustrates a screenshot with opinion sliders. Upon load of the document shown in screenshots 1100-1300, the Echo Reader interface calls a subset of all representative opinions to the reader's attention. Because the user wishes to get the best overview of the crowd's opinions, the user may want to proverbially "turn up the volume," so he/she can see more of the representative opinions in this document. The user can move the cursor over the right hand side of the screen, and a slider under the word. Representative fades in (1305). The user can use this slider to adjust (more or less) the amount of representative opinion call-outs in the text. These newly highlighted opinions are about subjects that are slightly less important or opinions that may be slightly further away from the community, but still representative.

After spot exploring a handful of opinions that are called out in the document, the user may want to see an overview of what and how this document's representative opinions fit in into the broader corpus of documents. The user may once again move the cursor over the right hand side of the screen. During a slightly longer hover event (as compared to the shorter hover event that produced the opinion slider 1305), a scrollable (1315) list of representative opinions then appears (1310). The list consists of a series of topics, with the modifying opinions appearing below the subject. For example, topics may include "Ryan" 1320*a*, "Cut" 1320*b*, "Committee" 1320*e*, and so on. Opinions about these topics that appear in the document shown in the screenshot 1300 include "Ryan is risky" 1325*a*, "Cut is new" 1325*b*, and "Committee is influential" 1325*c*, respectively. In various examples, each opinion may appear in italic, and has an opinion distribution sparkline next to it, e.g., sparkline 1330 for opinion "Ryan is risky" 1325*a*. The user can now easily find noteworthy opinions he/she may have missed.

If the user manipulates the slider 1305 under the word Representative, not only would more/less crucial opinions appear called out in the text, but more/less opinions would populate this list. When the document has more than one opinion on a subject, they would both appear below the topic, as shown with opinion sparkline 1400 in FIG. 14.

Figure 15:
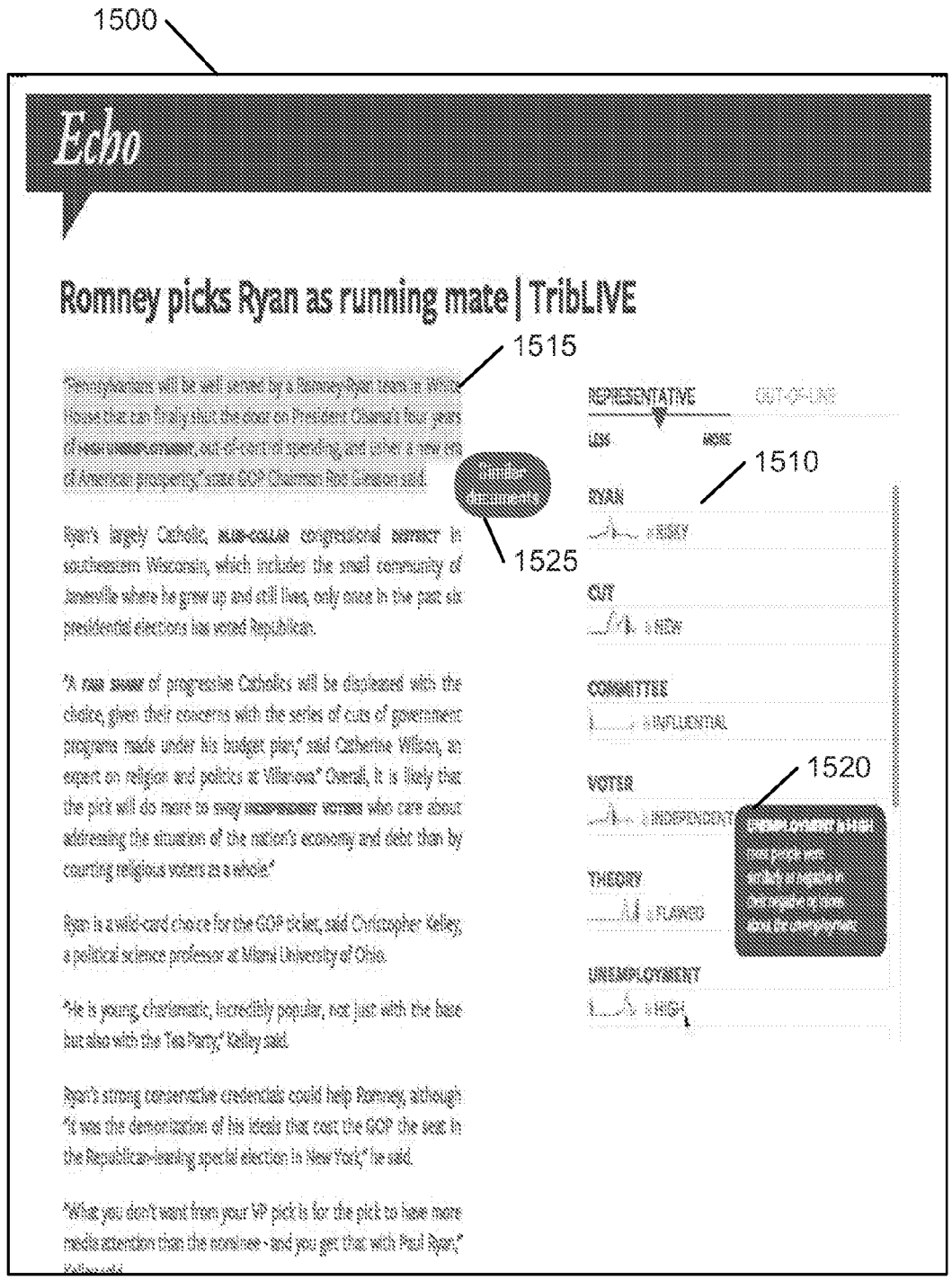
FIGS. 15-16 illustrates other example screenshots for the Document Reader User Interface implemented by the Document Reader User Interface engine of FIG. 2.

FIG. 15 illustrates another example screenshot with highlighted text. Each Opinion in the list 1510 of screenshot 1500 corresponds to a specific word/sentence in the text. When the user hovers over an opinion in the list 1510, the Echo Reader interface may auto scroll to where that opinion occurred in the text, highlight the sentence with the opinion 1515 (e.g., in a different color like a yellow highlighter) and provide a brief explanation 1520 situating this opinion in the broader context of the corpus of documents.

It is appreciated that highlighting or pointing to text from a list has been empirically shown to be a powerful interaction to improve document browsing. Thus with this overview and interaction, the user can quickly survey the representative opinions in each document, quickly gauge their sentiment, see the document context, and place each opinion within the spectrum of the crowd. It is also appreciated that the user can request to see documents with opinions similar to the opinion highlighted in the document. For example, the user can click on an icon or call-out 1525 to pull up a list of documents in the Echo Locator user interface with opinions similar to the one highlighted. This enables the user to compare the document in screenshot 1500 with other similar documents from the crowd.

Figure 16:
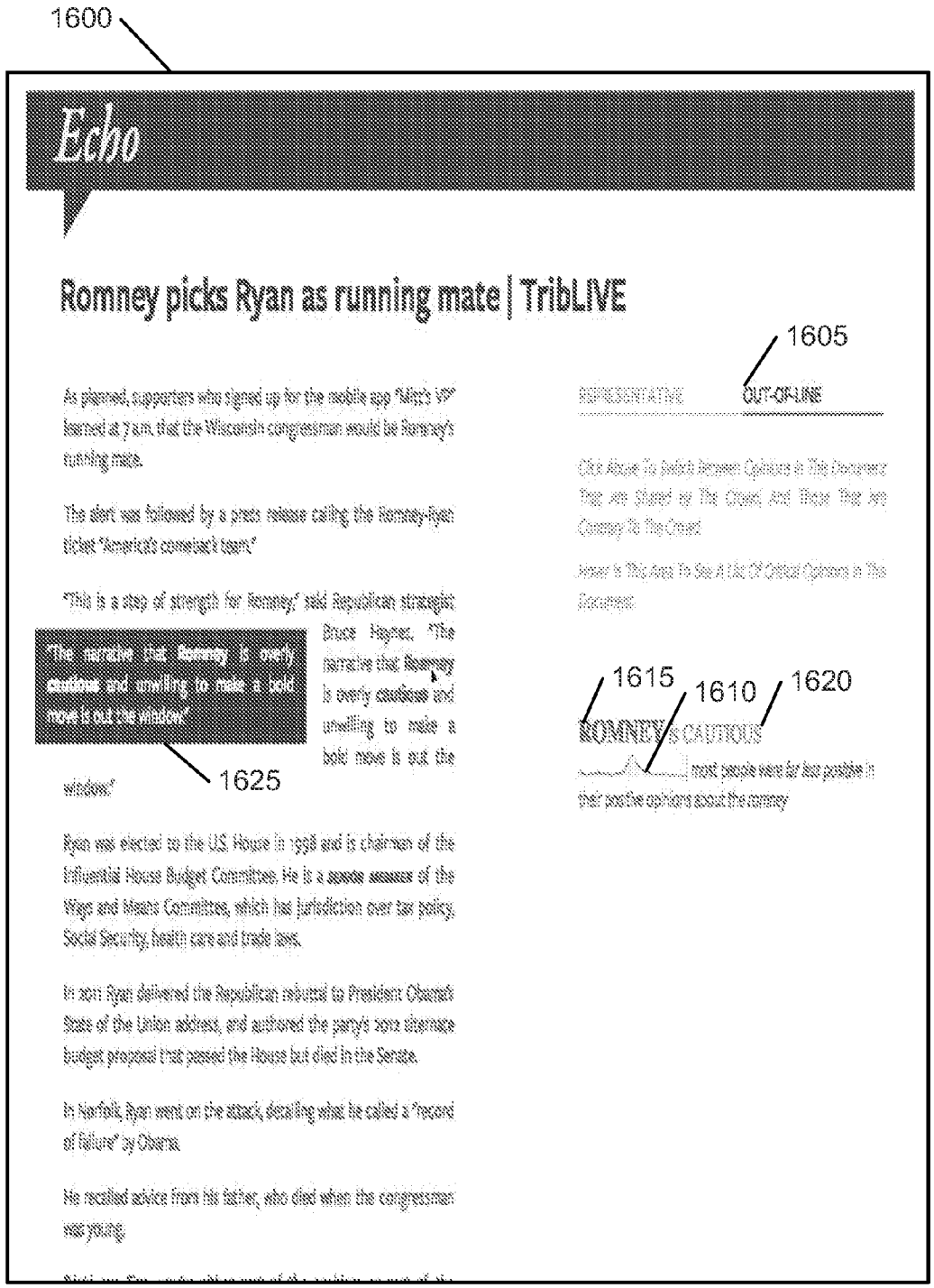

The user may also see where a given document differs from the crowd. Attention is now directed to FIG. 16, which shows an example screenshot illustrating out-of-line opinions. Next to the word Representative on the right, hand side of the Echo Reader interface screenshot 1600, is the word Out-Of-Line 1605. By clicking on the word 1605, the Echo Reader interface switches from bringing representative opinions to the reader's attention to calling-out those important topics that greatly differ in their opinion (as compared to the crowd). The user can now visually see the differing opinions in the document through call-outs and typographic changes. Just as with the representative opinions, the user can use community context hover events in the body copy, explore with a summary list, and adjust an Out-Of-Line opinion slider to adjust the amount of call-out. For example, the user can clearly see in the sparkline 1610 how less positive about the topic "Romney" 1615 the crowd is as compared to the opinion that "Romney is Cautious" 1620. Call-out 1625 enables the user to immediately see upon document load the most important out-of-line opinion in the document. By keeping Representative and Out-Of-Line opinions separate through two modes, the Echo Reader interface avoids contusion as to what type of call-out (or what element in the list) is representative and what is differing from the crowd.

Figure 11:
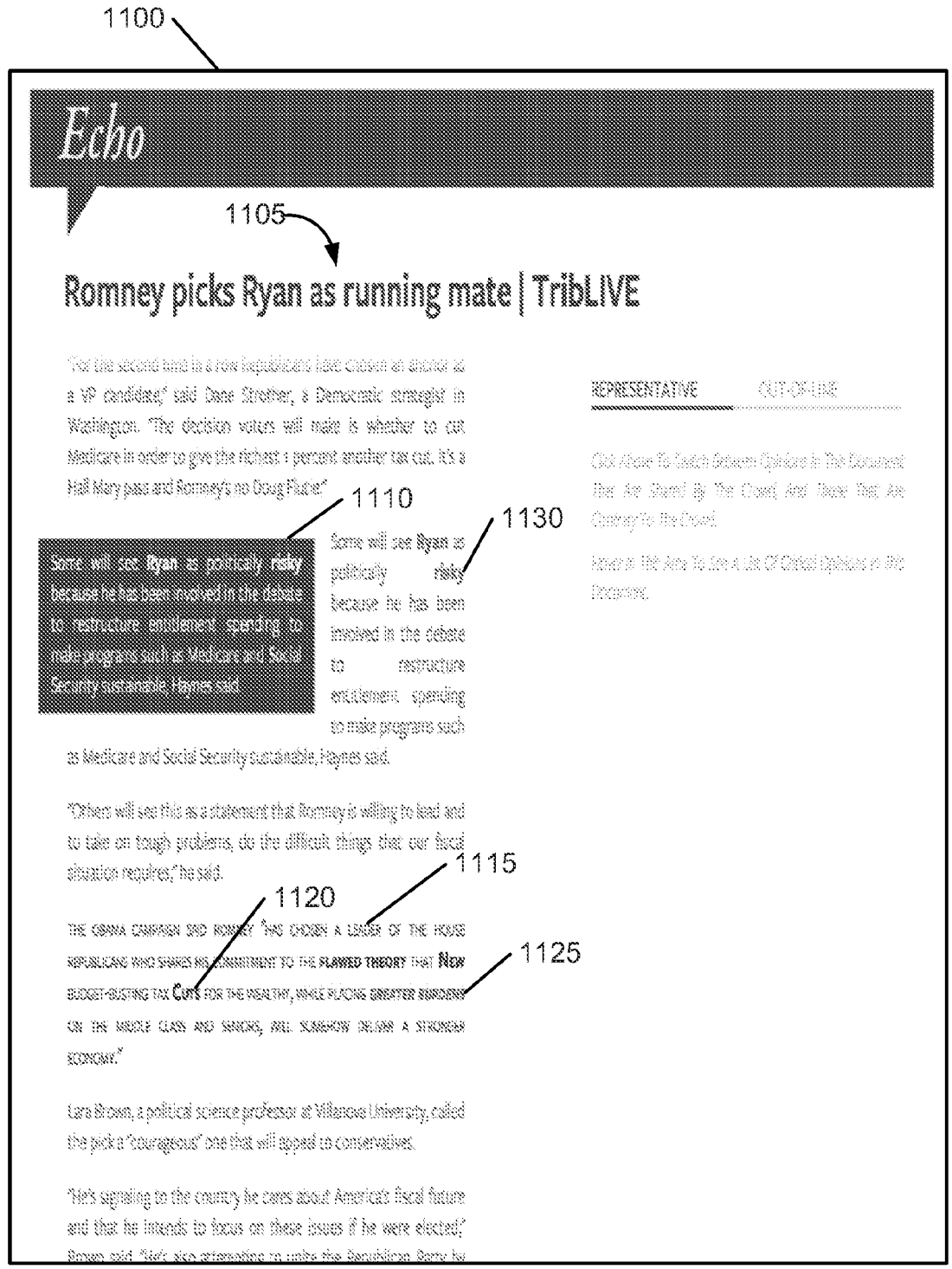
FIGS. 11-13 illustrate example screenshots for a Document Reader User Interface implemented by the Document Reader User Interface engine of FIG. 2.
Figure 12:
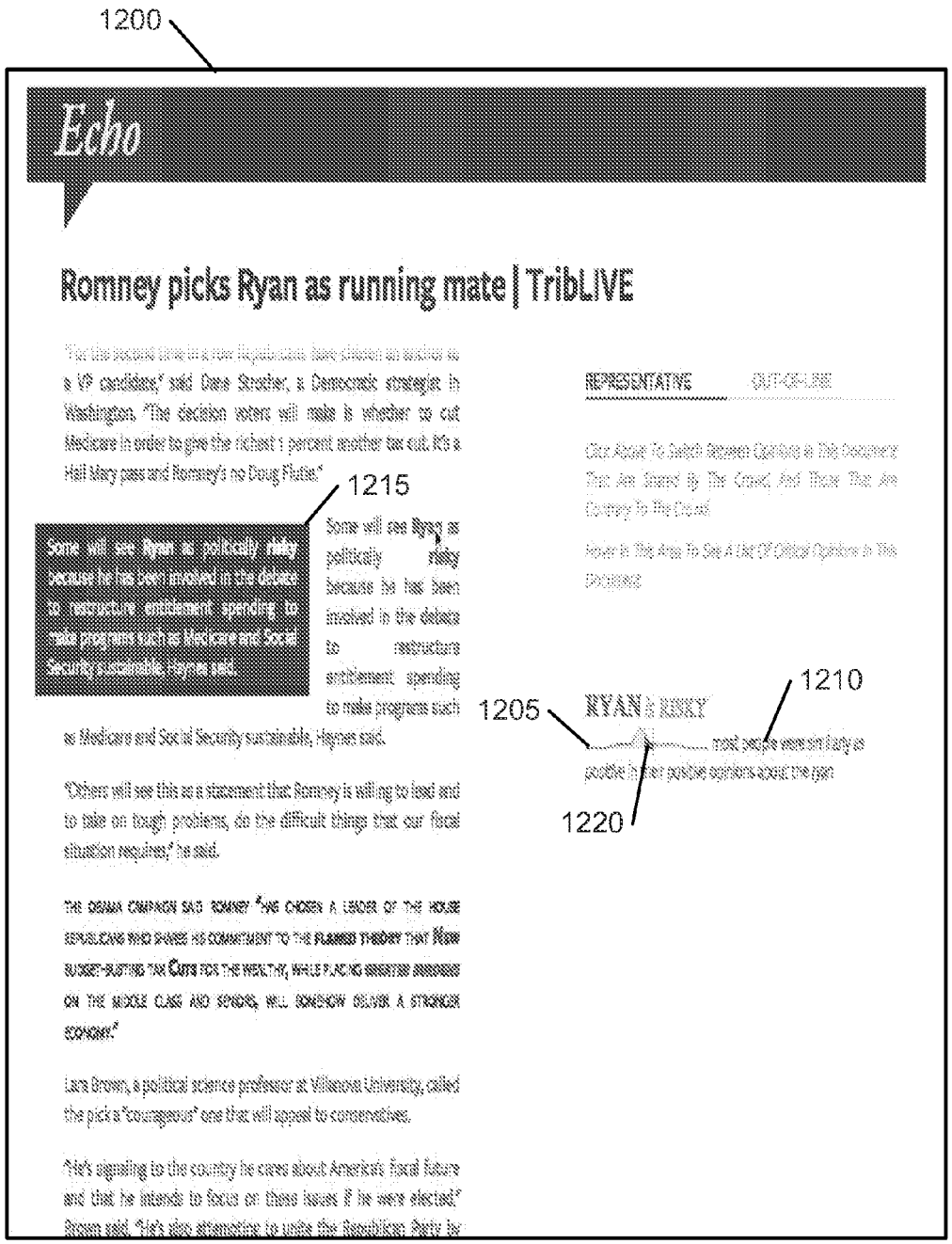

It is appreciated that when the user has finished reading the document shown in screenshot 1600, he/she can continue exploring the corpus of documents by returning to the Echo Locator interface (FIG. 11). For example, after reading the document shown in screenshot 1600, the user knows he/she needs more information about how people talk about another topic. The user may quickly filter the list of documents in the Echo Locator interface shown in FIG. 11 by clicking on the word corresponding to the topic of interest, and get an alphabetically sorted list of documents that have opinions on the desired topic. The user can re-sort the document list, finding documents that are highly out-of-line or representative of the crowd's opinion on the chosen topic, and begin reading those documents in the Echo Reader interface illustrated in EEGs. 12-16.

Advantageously, the content platform described herein enables users to automatically have an editor's wisdom with the elegance of a magazine. The content platform is able to mine documents in a corpus of documents to identify the most important topics talked about in the corpus and the most important opinions associated with those topics. The most important topics and opinions are then brought to the user's attention through elegant interfaces with edited and visually modified text corresponding to those topics and opinions. This allows a user to "read as normal", while focusing his/her attention on the important topics and opinions within documents and how they relate to the crowd.

It is appreciated that the previous description of the disclosed examples is provided to enable any person skilled in the art to make or use the present disclosure. Various modifications to these examples will be readily apparent to those skilled in the art, and the generic principles defined herein may be applied to other examples without departing from the spirit or scope of the disclosure. Thus, the present disclosure is not intended to be limited to the examples shown herein but is to be accorded the widest scope consistent with the principles and novel features disclosed herein.

What is claimed is:

1. A computer implemented method for presenting documents to a user based on topics and collective opinions expressed in the documents, comprising:
mining a corpus of documents to identify a set of topics;
analyzing, by a processor, each document in the corpus of documents to determine a set of opinions associated with the set of topics;
classifying each opinion in the set of opinions as a representative opinion or as an out-of-line opinion;
ranking the representative opinions and the out-of-line opinions into tiers;
presenting the corpus of documents based on the set of topics and the set of opinions; and
visually modifying a document in the corpus of documents according to the tiers of the set of opinions, including rendering text in the document associated with an opinion according to the opinion's tier.

2. The computer implemented method of claim 1, wherein mining a corpus of documents to identify a set of topics comprises extracting a body copy of each document in the corpus of documents.

3. The computer implemented method of claim 1, wherein mining a corpus of documents to identify a set of topics comprises ranking each word in the corpus of documents by importance across the set of topics and the corpus of documents.

4. The computer implemented method of claim 1, wherein analyzing, by a processor, each document in the corpus of documents to determine a set of opinions associated with the set of topics comprises statistically parsing each sentence in each document to determine a set of modifiers associated with a subject in each sentence.

5. The computer implemented method of claim 4, further comprising calculating a sentiment score for each modifier.

6. The computer-implemented method of claim 5, wherein the set of opinions associated with the set of topics comprises a set of modifiers associated with a set of subjects.

7. The computer implemented method of claim 6, further comprising determining a distribution of opinions across the corpus of documents.

8. A content platform system for presenting documents to a user based on topics and collective opinions expressed in the documents, comprising:
a processor; and
a non-transitory computer readable medium storing instructions that when executed by the processor cause the processor to:
mine a corpus of documents to determine a set of opinions associated with a set of topics;
classify each opinion in the set of opinions as a representative opinion or as an out-of-line opinion;
rank the representative opinions and the out-of-line opinions into tiers;
present the corpus of documents based on the set of topics and the set of opinions; and
visually modify a document in the corpus of documents according to the tiers of the set of opinions, including rendering text in the document associated with an opinion according to the opinion's tier.

9. The content platform system of claim 8, wherein the instructions are to cause the processor to parse each sentence in each document to determine a set of modifiers associated with a subject in each sentence, the set of modifiers associated with a subject representing a plurality of opinions about the subject.

10. The content platform system of claim 8, wherein the instructions are to cause the processor to display documents that have opinions on a clicked topic from the set of topics.

11. The content platform system of claim 8, wherein the instructions are to cause the processor to sort documents in the corpus of documents according to the representative opinions and the out-of-line opinions.

12. The content platform system of claim 8, wherein, to visually modify a document according to the tiers of the set of opinions, the instructions are to cause the processor to modify the document with call-outs or called-out text corresponding to representative and out-of-line opinions.

13. A non-transitory computer readable medium comprising instructions executable by a processor to:
identify a set of topics and a set of opinions associated with the set of topics in a corpus of documents;
classify each opinion in the set of opinions as a representative opinion or as an out-of-line opinion;
rank the representative opinions and the out-of-line opinions into tiers;
present the corpus of documents based on the set of topics and the set of opinions; and
visually modify the presentation of a document in the corpus of documents according to the tiers of the set of opinions, including rendering text in the document associated with an opinion according to the opinion's tier.

14. The non-transitory computer readable medium of claim 13, wherein to present the corpus of documents based on the set of topics and the set of opinions comprises to list documents in the corpus of documents by the set of topics and sort documents in each topic in the set of topics based on the set of opinions.

15. The non-transitory computer readable medium of claim 13, wherein to visually modify the presentation of a document in the corpus of documents, the instructions are to cause the processor to display a plurality of sparklines illustrating distributions of opinions in the set of opinions and to call out text in the document as a cursor hovers over one of the plurality of sparklines.

* * * * *